UNITED STATES PATENT OFFICE.

ALFRED P. GOODELL, OF DAVISBURG, MICHIGAN, ASSIGNOR TO RALZEMOND A. PARKER, OF DETROIT, MICHIGAN.

PROCESS OF PRESERVING WOOD AND PRODUCT THEREOF.

1,134,044.

Specification of Letters Patent. Patented Mar. 30, 1915.

No Drawing. Application filed December 9, 1912. Serial No. 735,583.

*To all whom it may concern:*

Be it known that I, ALFRED P. GOODELL, a citizen of the United States, residing at Davisburg, county of Oakland, State of Michigan, have invented a certain new and useful Improvement in Processes of Preserving Wood and Products Thereof; and I declare the following to be a full, clear, and exact description of the same, such as will enable others skilled in the art to which it pertains to make and use the same, reference being had to the accompanying drawings, which form a part of this specification.

This invention relates to a process and a product thereof of water-proofing and preserving posts, ties and like articles of wood when treated as hereinafter stated.

It consists in the particular steps hereinafter described and claimed in the claims annexed hereto.

In order to carry out my invention, I first take any article of wood desired to be treated and preferably after seasoning and drying, dip it in a prepared vat of hot melted coal tar pitch or like hydrocarbon having sufficient consistency to enter into and form a union with the pores on the surface of the wood, and then immediately, before the pitch has time to cool or become sensibly rigid, I dip the article so coated into a vat of prepared Portland cement, sand and water, made sufficiently liquid to flow freely, thereby a coating of cement unites with and adheres to the plastic pitch, forming a complete bond or union therewith. The article so treated is then set aside, the pitch cooling and the cement setting, thus forming an absolutely water-proof, indestructible covering to the wooden article so treated.

Heretofore it has been found, when wooden articles have been dipped in coal tar pitch alone or tar, or other hydrocarbon products, that the coating would, under the heat of the sun, melt and become fluid or semi-fluid, making it very inconvenient to handle the article and permitting the covering to become abraded therefrom. I am well aware too, that wooden articles have been covered with cement of the character described, but cement is not water-proof and therefore does not protect the same from moisture. I have found by experience that the cement will not adhere to coal tar pitch when solidified, nor to any other hydrocarbon of like nature, and that therefore, when I attempted to cover such articles with a coating of cement, the cement would scale off and the article would become practically useless in that regard. I have found that by coating the article with liquid Portland cement of a proper mixture (which is well known, say of one to two in proportion of cement and sand with sufficient water added) when the pitch is in a liquid or semi-liquid state, the liquid cement so created combines with the pitch so that there is a perfect bond between the two without air spaces or other defects and thereby the cement is prevented from scaling as hereinbefore stated and it becomes a perfect preservative of the inner pitch coating.

It is obvious that the vats for heating the pitch and for holding the liquid cement may be of any suitable form and that they therefore need not be described in detail.

I am aware of the Joseph Perret Patent No. 539,485 of May 21, 1895, dealing with pile coverings and wherein it is suggested to coat a pile with tar, covering the same with gravel or the like, subsequently sprinkling the dry cement over the gravel but obviously, there is not presented in such a structure, a thin shell of cement directly enveloping the tar protecting coating, nor such cement in intimate contact with the said coating throughout the extent of the latter, such as it is desired to protect herein.

Having thus described my invention, what I desire to claim is:—

1. A process of preserving and water-proofing railway ties, etc., consisting of, first, coating the seasoned, dried article to be preserved with melted coal tar pitch, second, coating the said article so treated before said pitch has ceased to be liquid, with a coating of liquid Portland cement, substantially as described.

2. Protected wood of the character described, comprising a wood body, a coating of coal tar pitch covering the same to protect the wood, and a thin shell of cement directly enveloping and in intimate contact with the adjacent surface of the said coating throughout the extent of the latter to protect the same.

In testimony whereof, I sign this specification in the presence of two witnesses.

ALFRED P. GOODELL.

Witnesses:
 VIRGINIA C. SPRATT,
 AMELIA C. KOEHN.